US009647250B2

(12) United States Patent
Muck et al.

(10) Patent No.: US 9,647,250 B2
(45) Date of Patent: May 9, 2017

(54) ENERGY STORAGE ARRANGEMENT

(71) Applicant: Bayerische Motoren Werke Aktiengesellschaft, Munich (DE)

(72) Inventors: Alexander Muck, Munich (DE); Tuncay Idikurt, Munich (DE); Norbert Linz, Iphofen (DE); Matthias Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 221 days.

(21) Appl. No.: 14/678,235

(22) Filed: Apr. 3, 2015

(65) Prior Publication Data
US 2015/0214522 A1 Jul. 30, 2015

Related U.S. Application Data

(63) Continuation of application No. PCT/EP2013/069197, filed on Sep. 17, 2013.

(30) Foreign Application Priority Data

Oct. 4, 2012 (DE) ................... 10 2012 218 162

(51) Int. Cl.
*H01M 2/02* (2006.01)
*H01M 2/10* (2006.01)
(Continued)

(52) U.S. Cl.
CPC ............. *H01M 2/1077* (2013.01); *B60K 1/04* (2013.01); *B60L 11/1864* (2013.01);
(Continued)

(58) Field of Classification Search
CPC .................................................. H01M 2/1077
See application file for complete search history.

(56) References Cited

U.S. PATENT DOCUMENTS 3,476,286 A   11/1969  Steffens
3,884,725 A    5/1975  Schmidt
(Continued)

FOREIGN PATENT DOCUMENTS

CN    102308412 A     1/2012
DE    101 22 682 A1  11/2001
(Continued)

OTHER PUBLICATIONS

Chinese-language Office Action issued in counterpart Chinese Application No. 201380043665.4 dated Jul. 1, 2016 with English translation (Eight (8) pages).

(Continued)

*Primary Examiner* — Matthew Merkling
(74) *Attorney, Agent, or Firm* — Crowell & Moring LLP

(57) ABSTRACT

An energy storage arrangement for supplying electric power, in particular in a motor vehicle, includes at least a first energy storage module and a second energy storage module mounted on top of the first energy storage module. Each energy storage module has two end plates and a plurality of storage cells tensioned between the end plates. At least one end plate of the first energy storage module is secured by at least one first screw, and at least one end plate of the second energy storage module is secured by at least one second screw. An internal thread is formed in the screw head of the first screw, and the second screw is screwed into the screw head of the first screw.

13 Claims, 4 Drawing Sheets

(51) Int. Cl.
  *B60K 1/04*    (2006.01)
  *H01M 10/625*  (2014.01)
  *H01M 10/613*  (2014.01)
  *B60L 11/18*   (2006.01)
  *H01M 10/6554* (2014.01)

(52) U.S. Cl.
  CPC ....... *B60L 11/1874* (2013.01); *B60L 11/1877* (2013.01); *B60L 11/1879* (2013.01); *H01M 2/1072* (2013.01); *H01M 10/613* (2015.04); *H01M 10/625* (2015.04); *B60Y 2306/01* (2013.01); *H01M 10/6554* (2015.04); *H01M 2220/20* (2013.01); *Y02T 10/7005* (2013.01); *Y02T 10/7061* (2013.01)

(56) References Cited

U.S. PATENT DOCUMENTS

| | | | | |
|---|---|---|---|---|
| 8,669,000 | B2* | 3/2014 | Yoon | H01M 2/1077 |
| | | | | 429/156 |
| 2002/0006544 | A1 | 1/2002 | Asaka et al. | |
| 2006/0083980 | A1 | 4/2006 | Choo et al. | |
| 2008/0248377 | A1* | 10/2008 | Hashida | H01M 2/1016 |
| | | | | 429/99 |
| 2011/0003187 | A1* | 1/2011 | Graaf | H01M 10/625 |
| | | | | 429/120 |
| 2012/0156537 | A1 | 6/2012 | Meintschel et al. | |
| 2013/0189559 | A1 | 7/2013 | Giere | |
| 2015/0255837 | A1* | 9/2015 | Larsson | H01M 10/6554 |
| | | | | 429/120 |
| 2016/0064716 | A1* | 3/2016 | Sakai | H01M 2/20 |
| | | | | 429/121 |

FOREIGN PATENT DOCUMENTS

| | | |
|---|---|---|
| DE | 10 2009 005 124 A1 | 7/2010 |
| JP | 11-339761 A | 12/1999 |
| JP | 2008-282639 A | 11/2008 |
| WO | WO 2012/038008 A1 | 3/2012 |

OTHER PUBLICATIONS

International Search Report (PCT/ISA/210) dated Oct. 24, 2013 with English translation (five pages).
German Search Report dated May 24, 2013 with partial English translation (10 pages).

* cited by examiner

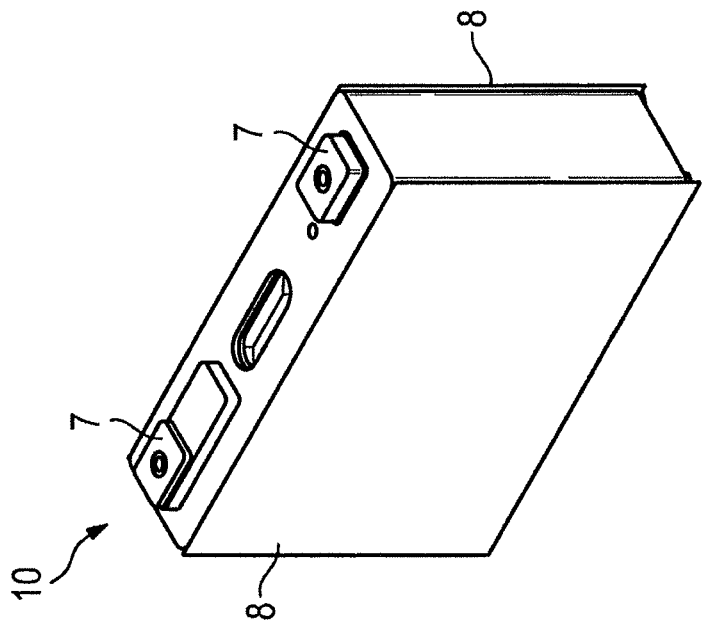
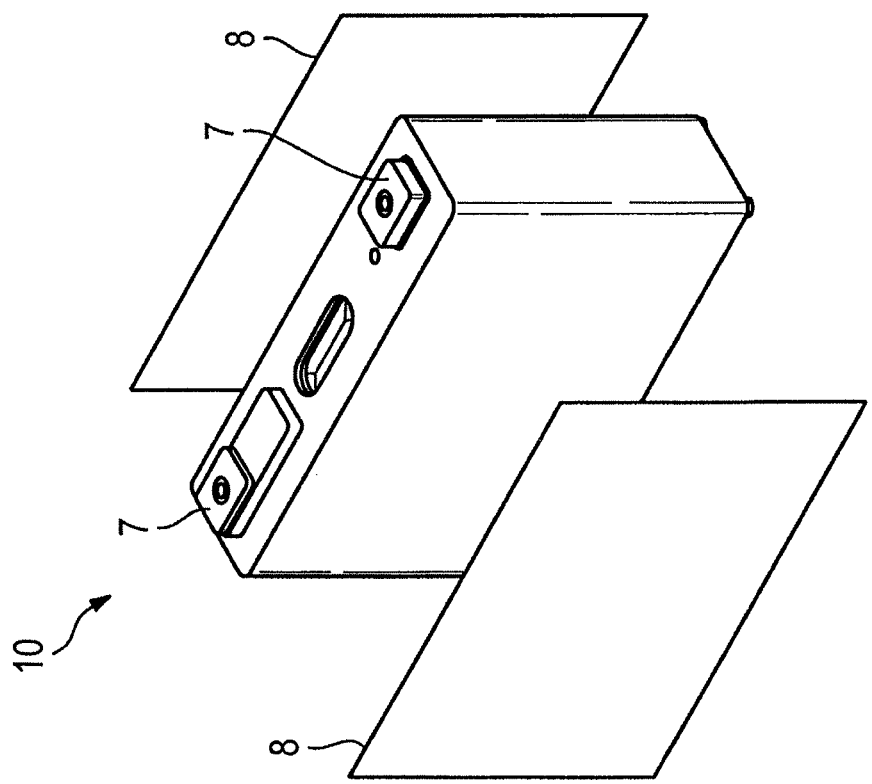
Fig. 2

ENERGY STORAGE ARRANGEMENT

CROSS REFERENCE TO RELATED APPLICATIONS

This application is a continuation of PCT International Application No. PCT/EP2013/069197, filed Sep. 17, 2013, which claims priority under 35 U.S.C. §119 from German Patent Application No. 10 2012 218 162.8, filed Oct. 4, 2012, the entire disclosures of which are herein expressly incorporated by reference.

BACKGROUND AND SUMMARY OF THE INVENTION

The invention relates to an energy storage arrangement for supplying electric power, in particular in a motor vehicle. The energy storage arrangement is composed of at least two energy storage modules. In each energy storage module, a plurality of storage cells are braced against one another between two end plates.

In a device for supplying electric power in a motor vehicle, usually characterized as a battery, a plurality of energy storage modules are generally used to drive the vehicle, for example in electric vehicles or hybrid vehicles. Each energy storage module typically includes a plurality of stacked prismatic storage cells. The individual storage cells contain electrochemical cells of the battery. In most cases, the stack of individual storage cells is tensioned (braced) by use of a mechanical end plate and a tie bar to form the energy storage module. In addition to mechanically securing the modules relative to one another, the end plates and tie bar serve, in particular, to counteract any deformation resulting from changes in gas pressure in the electrochemical cells arranged inside the modules that may occur during operation.

The object of the present invention is to provide an energy storage assembly in which a plurality of energy storage modules are combined in a weight-optimized, reliable and crash-proof manner in a cost-efficient production and assembly process.

This and other objects are achieved by an energy storage arrangement for supplying electric power, in particular in a motor vehicle, said arrangement having at least a first energy storage module and a second energy storage module which is mounted on top of the first energy storage module. Each of the energy storage modules has two end plates and a plurality of storage cells tensioned between the end plates. The storage cells are generally embodied as prismatic and are stacked in series in the energy storage module. Thus, an energy storage module may comprise a single row of storage cells or a plurality of parallel rows of storage cells. The individual storage cells, in turn, comprise a plurality of electrochemical cells. The energy storage modules are secured by way of screws. The screws are inserted through the end plates. The screws used for securing a first, lower energy storage module are identified as "first screws". The second energy storage module, mounted on top of the first, is secured by "second screws".

According to the invention, an internal thread is formed in the screw heads of the first screws. The second screws are screwed into the internal thread in the screw heads of the first screws. Thus, according to the invention, the end plates of the upper energy storage module can be attached directly to the end plates of the lower energy storage module. In this process, the upper energy storage module is screw-connected to the screw heads of the first screws.

According to the invention, no supporting intermediate bases are necessary between the energy storage modules, and no special structures are required in the housing in order to attach the second energy storage module. The result is a cost-effective, assembly-optimized and weight-optimized configuration of the energy storage arrangement, particularly for a motor vehicle. The energy storage arrangement is used, in particular, for exclusive or for auxiliary driving of the motor vehicle. The term "motor vehicle" includes automobiles, trucks, forklifts, etc.

More than two energy storage modules are preferably arranged one on top of the other, in which case one energy storage module is screw-connected to the screw heads of the energy storage module beneath it.

Particularly preferably, each end plate is secured by at least two screws. The end plates of the bottommost energy storage module (first energy storage module) are preferably screw-connected to a housing or a supporting structure.

It is further preferably provided that an inner polygon is formed in the screw head of the first screw. This inner polygon is arranged coaxially to the internal thread in the screw head. The first screw can be tightened via the inner polygon using an appropriate tool.

It is further preferably provided that the first screw comprises a shoulder. The shoulder rests on one of the end plates of the first energy storage module. One end plate of the second energy storage module rests on the screw head of the first screw. In particular, the first screw comprises a lower region, which has an external thread, and an intermediate region between the lower region and the screw head. The external diameter of the screw head is preferably greater than that of the intermediate region and the lower region. As a result, the above-mentioned shoulder is formed at the transition point between screw head and intermediate region.

It is further preferably provided that an intermediate base is arranged between the first energy storage module and the second energy storage module. This intermediate base does not serve as the sole supporting structure for the second energy storage module. The intermediate base is used for supporting a cooling device, for example. The cooling device is mounted on the intermediate base and serves to cool the second energy storage module. Moreover, the intermediate base can be used as a simple insulation element between the two energy storage modules. The intermediate base is preferably clamped between the screw head of the first screw and one of the end plates of the second energy storage module. The intermediate base is preferably also used for supporting the energy storage modules on the housing and therefore for stabilizing the energy storage assembly.

In the preferred embodiment, the first screws and the second screws are identical, allowing the number of shared components used to be maximized. In that case, the internal thread formed in the screw head of the second screw remains unused.

The end plates of the energy storage modules preferably comprise vertical through holes, into which the first and/or second screws are inserted. These through holes preferably span the entire height of the end plates, so that the entire length of the first and/or second screws is accommodated within the end plates.

The invention further comprises an energy storage arrangement for supplying electric power, in particular in a motor vehicle, having at least one energy storage module and a component mounted on the first energy storage module. The energy storage module comprises two end plates and a plurality of storage cells tensioned between the end plates. At least one end plate of the energy storage module is secured by way of at least one first screw, and the component is secured by at least one second screw, wherein an internal thread is formed in the screw head of the first screw, and the second screw is screwed into the screw head of the first screw. The component to be secured is preferably a cover, a protection box or a control unit. The screws are embodied similarly to the stacking of the energy storage modules.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a perspective view of a single storage cell of an energy storage module of the energy storage arrangement of the invention, according to the embodiment and shown in exploded and assembled form;

DETAILED DESCRIPTION OF THE DRAWINGS

Figure 1:
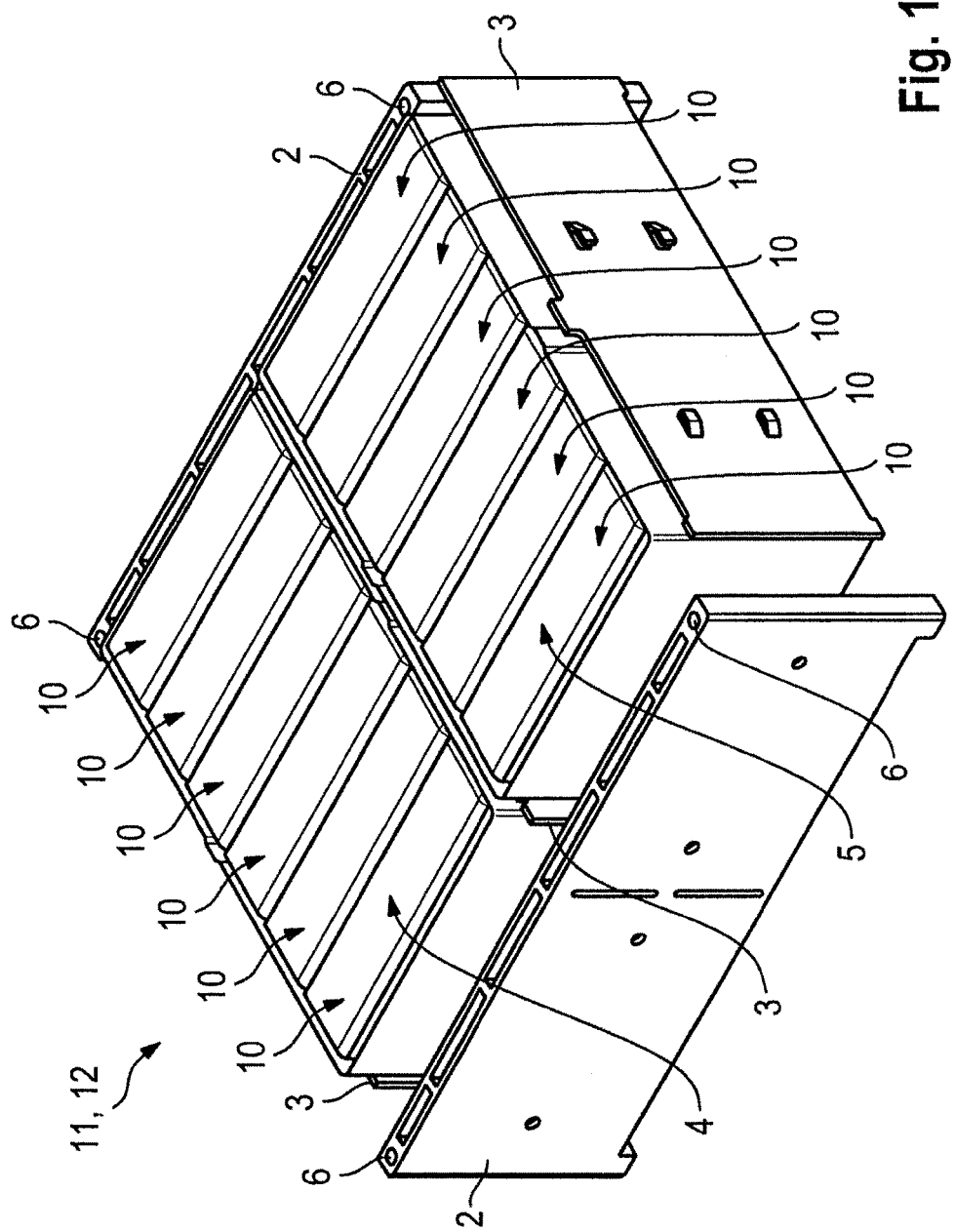
FIG. 1 is a perspective view of an energy storage module of the energy storage arrangement of the invention, according to one embodiment example.

In the following, one embodiment of an energy storage arrangement 1 is described in reference to FIGS. 1 to 4. The energy storage arrangement 1 is composed of at least a first energy storage module 11 and a second energy storage module 12 mounted on top of the first energy storage module 11. The two energy storage modules 11, 12 have the same configuration. FIG. 1 shows one of the two energy storage modules 11, 12.

In the energy storage module 11, 12 according to FIG. 1, a plurality of storage cells 10 are arranged in series. According to FIG. 1, two rows 4, 5 are provided, each having six storage cells 10. This assembly represents merely an example. For example, it is also possible for only one row 4 comprising 16 storage cells 10 to be provided. The storage cells 10 stacked in series are arranged between two end plates 2. The end plates 2 are also characterized as pressure plates. The end plates 2 are connected to one another via three tie bars. If only one of rows 4 and 5 is provided, then center tie bar 3 can be dispensed with. The tie bars 3 are welded to the two end plates 2.

Two through holes 6 are provided in each of the end plates 2. A screw connection is established via these through holes 6, which will be described in relation to FIG. 3.

FIG. 2 shows a single storage cell 10. Storage cell 10 has two connecting terminals 7. Insulating films 8 are attached to both sides of storage cell 10, so that the individual storage cells 10 are insulated against one another in the energy storage module 11, 12.

Figure 3:
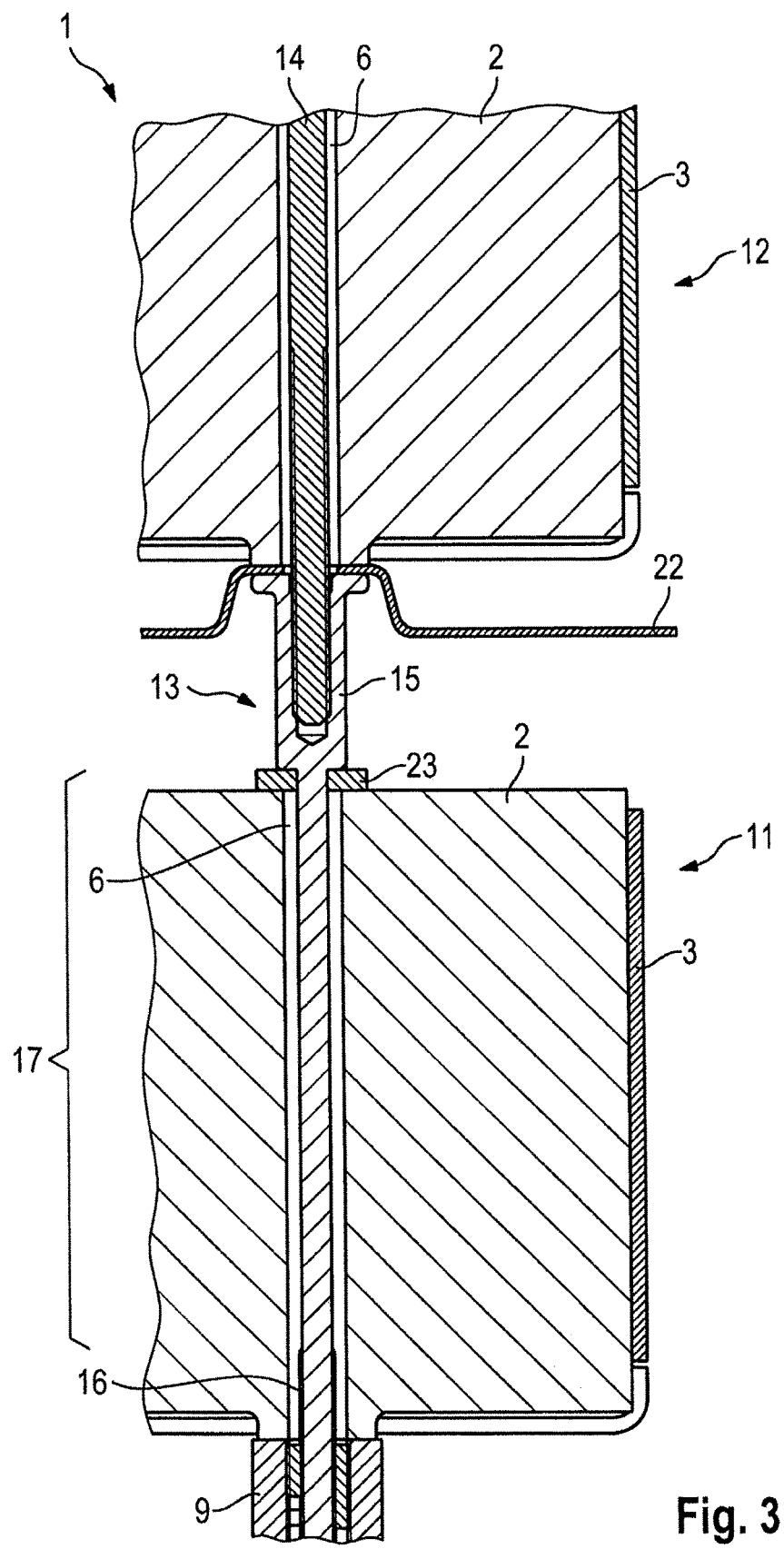
FIG. 3 is a detail cross-section view of the energy storage arrangement of the invention, according to the embodiment.
Figure 4:
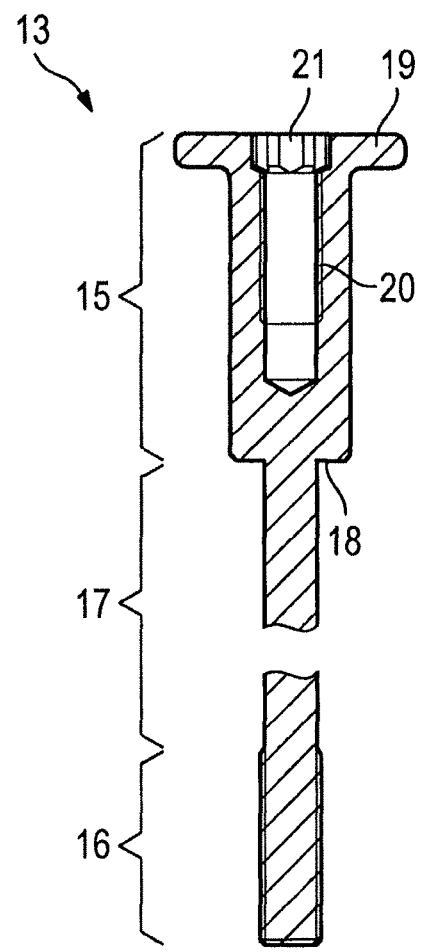
FIG. 4 is a first screw used in the energy storage arrangement of the invention, according to the embodiment.

FIG. 3 shows a sectional cross-section of energy storage assembly 1. In FIG. 3, second energy storage module 12 is mounted on first energy storage module 11. First energy storage module 11 rests on a housing 9.

The figure shows a cross-section of the end plates 2 of energy storage modules 11 and 12. End plate 2 of first energy storage module 11 shown is screw-connected to housing 9 by way of a first screw 13. First screw 13 is inserted in through hole 6. First screw 13 is illustrated in detail in FIG. 4. First screw 13 is divided lengthwise into a screw head 15, a lower region 16 and an intermediate region 17 located between screw head 15 and lower region 16. An external thread is formed on lower region 16. First screw 13 is screw-connected to housing 9 by way of this external thread on the lower region 16. Intermediate region 17 has no thread. An internal thread 20 is formed in screw head 15. An inner polygon 21 is arranged coaxially to internal thread 20. Inner polygon 21 is used for rotating and, therefore, for tightening first screw 13 in housing 9.

At the transition from intermediate region 17 to screw head 15, a shoulder 18 is formed. A brim 19 is located at the upper end of screw head 15.

As FIG. 3 shows, shoulder 18 presses via a washer 23 against the upper end of end plate 2 of first energy storage module 11.

Second energy storage module 12, in particular, one of the end plates 2 of second energy storage module 12, rests on brim 19 of screw head 15 of first screw 13. A second screw 14 is inserted through through hole 6 in end plate 2 of second energy storage module 12. This second screw 14 is screwed into internal thread 20 in screw head 15 of first screw 13. Therefore, second energy storage module 12 is screw-connected directly to first screw 13 of first energy storage module 11.

An intermediate base 22 is clamped between end plate 2 of second energy storage module 12 and screw head 15 of first screw 13. Intermediate base 22 performs no supporting function for second energy storage module 12, but instead serves to hold a cooling device, for example.

The embodiment example illustrates a cost-effective, easy-to-assemble and weight-optimized option for stacking energy storage modules 11 and 12.

LIST OF REFERENCE SIGNS 1 energy storage arrangement
2 end plate
3 tie bar
4, 5 rows
6 through holes
7 connecting pole
8 insulating film
9 housing
10 storage cells
11 first energy storage module
12 second energy storage module
13 first screw
14 second screw
15 screw head
16 lower region
17 intermediate region
18 shoulder
19 brim
20 internal thread
21 inner polygon
22 intermediate base
23 washer The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage arrangement for supplying electric power, comprising:
    at least a first energy storage module, and a second energy storage module mounted on the first energy storage module;
    each energy storage module comprises two end plates and a plurality of storage cells tensioned between the end plates;
    at least one end plate of the first energy storage module is secured by at least one first screw, and at least one end plate of the second energy storage module is secured by at least one second screw; and
    wherein an internal thread is formed in a screw head of the first screw, and the second screw is screwed into the screw head of the first screw.

2. The energy storage arrangement according to claim 1, wherein
    each end plate of the first energy storage module is secured by at least two first screws, and
    each end plate of the second energy storage module is secured by at least two second screws, which second screws are respectively screwed into the screw heads of the first screws.

3. The energy storage arrangement according to claim 1, wherein an inner polygon that is coaxial to the internal thread is formed in the screw head of the first screw, for rotating the first screw.

4. The energy storage arrangement according to claim 1, wherein
    the first screw comprises a shoulder,
    the shoulder rests on an end plate of the first energy storage module, and
    an end plate of the second energy storage module rests on the screw head of the first screw.

5. The energy storage arrangement according to claim 1, further comprising:
    an intermediate base arranged between the first energy storage module and the second energy storage module.

6. The energy storage arrangement according to claim 5, wherein the intermediate base is clamped between the screw head of the first screw and an end plate of the second energy storage module.

7. The energy storage arrangement according to claim 5, further comprising:
    a cooling device arranged on the intermediate base.

8. The energy storage arrangement according to claim 6, further comprising:
    a cooling device arranged on the intermediate base.

9. The energy storage arrangement according to claim 1, wherein the first screw comprises a lower region with an external thread and an intermediate region without thread, the intermediate region being between the screw head and the lower region.

10. The energy storage arrangement according to claim 9, wherein an external diameter of the screw head is greater than an external diameter of the intermediate region and of the lower region.

11. The energy storage arrangement according to claim 1, wherein the first screw is screwed into a housing of the energy storage arrangement.

12. The energy storage arrangement according to claim 1, wherein the arrangement is for a motor vehicle.

13. An energy storage arrangement for supplying electric power in a motor vehicle, comprising:
    at least one energy storage module and a component secured to the energy storage module; wherein
    the energy storage module comprises two end plates and a plurality of storage cells tensioned between the end plates,
    at least one end plate of the energy storage module is secured by at least one first screw, and the component is secured by at least one second screw, and
    an internal thread is formed in a screw head of the first screw, and the second screw is screwed into the screw head of the first screw.

* * * * *